United States Patent
Thies

(10) Patent No.: US 10,174,674 B2
(45) Date of Patent: Jan. 8, 2019

(54) DEVICE FOR THE EXTRACTION OF BLEED AIR AND AIRCRAFT ENGINE WITH AT LEAST ONE DEVICE FOR THE EXTRACTION OF BLEED AIR

(71) Applicant: Rolls-Royce Deutschland Ltd & Co KG, Blankenfelde-Mahlow (DE)

(72) Inventor: Robert Thies, Schwielowsee (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 657 days.

(21) Appl. No.: 14/845,842

(22) Filed: Sep. 4, 2015

(65) Prior Publication Data
US 2016/0069272 A1 Mar. 10, 2016

(30) Foreign Application Priority Data
Sep. 5, 2014 (DE) .......................... 10 2014 217 831

(51) Int. Cl.
| F02C 7/042 | (2006.01) |
| F01D 17/10 | (2006.01) |
| F02K 3/075 | (2006.01) |
| F01D 17/14 | (2006.01) |
| F16K 1/16 | (2006.01) |
| F16K 31/122 | (2006.01) |

(52) U.S. Cl.
CPC ............ F02C 7/042 (2013.01); F01D 17/105 (2013.01); F02K 3/075 (2013.01); *F01D 17/141* (2013.01); *F05D 2220/323* (2013.01); *F05D 2260/606* (2013.01); *F16K 1/16* (2013.01); *F16K 31/122* (2013.01)

(58) Field of Classification Search
CPC ...... F02C 7/042; F01D 17/105; F01D 17/141; F16K 1/16; F16K 1/18; F16K 31/122
See application file for complete search history.

(56) References Cited

U.S. PATENT DOCUMENTS

| 4,849,895 A | 7/1989 | Kervistin |
| 5,156,360 A * | 10/1992 | Shine ..................... B64D 29/00 244/129.1 |

(Continued)

FOREIGN PATENT DOCUMENTS

| CA | 2199875 | 4/1996 |
| DE | 102011011879 A1 | 8/2012 |
| WO | WO2008147260 A1 | 12/2008 |

OTHER PUBLICATIONS

German Search Report dated Aug. 13, 2015 from counterpart German Application No. 10 2014 217 831.2.

(Continued)

*Primary Examiner* — Lorne Meade
(74) *Attorney, Agent, or Firm* — Shuttleworth & Ingersoll, PLC; Timothy Klima

(57) ABSTRACT

A device for extraction of bleed air from flowing air at or in an aircraft engine includes an adjusting device for adjustment of an inlet cross section of an opening for the bleed air in or at a wall during operation of the aircraft engine. The opening for the bleed air is arranged in or at a deformable base and the adjusting device acts on the deformable base for modifying the inlet cross section of the opening relative to the flowing air. The deformable base is part of a metallic housing in the aircraft engine.

9 Claims, 8 Drawing Sheets

(56) References Cited

U.S. PATENT DOCUMENTS

| | | | |
|---|---|---|---|
| 5,269,135 A * | 12/1993 | Vermejan | F02C 7/04 60/226.1 |
| 5,279,109 A | 1/1994 | Liu et al. | |
| 5,351,732 A | 10/1994 | Mills et al. | |
| 5,826,794 A | 10/1998 | Rudolph | |
| 5,845,482 A * | 12/1998 | Carscallen | F01D 17/105 60/785 |
| 6,817,189 B2 | 11/2004 | Boeck | |
| 7,222,819 B1 * | 5/2007 | Kelnhofer | B64D 13/00 244/53 B |
| 7,540,142 B2 * | 6/2009 | Sheoran | F02C 7/042 137/15.1 |
| 7,976,272 B2 * | 7/2011 | Suciu | F01D 5/022 415/126 |
| 8,092,153 B2 | 1/2012 | Strecker et al. | |
| 8,250,852 B2 * | 8/2012 | Porte | F02C 7/141 60/226.1 |
| 8,347,601 B2 | 1/2013 | Brogren | |
| 8,397,513 B2 * | 3/2013 | Blanchard | F01D 17/141 137/855 |
| 8,408,008 B2 * | 4/2013 | Todorovic | F01D 11/24 60/782 |
| 8,425,283 B2 * | 4/2013 | Porte | B64D 33/08 454/73 |
| 9,267,390 B2 * | 2/2016 | Lo | F02C 6/08 |
| 9,771,873 B2 * | 9/2017 | Beecroft | F02C 9/18 |
| 2002/0005038 A1 | 1/2002 | Boeck | |
| 2006/0288688 A1 | 12/2006 | Lair | |
| 2008/0028763 A1 * | 2/2008 | Schwarz | F01D 15/10 60/771 |
| 2008/0131266 A1 | 6/2008 | Vrljes et al. | |
| 2008/0147260 A1 | 6/2008 | Moran | |
| 2008/0271433 A1 | 11/2008 | Olver | |
| 2009/0007567 A1 | 1/2009 | Porte et al. | |
| 2010/0215481 A1 | 8/2010 | Negulescu et al. | |
| 2013/0333390 A1 | 12/2013 | Barkowsky et al. | |
| 2014/0109589 A1 | 4/2014 | Pritchard, Jr. et al. | |

OTHER PUBLICATIONS

European Search Report dated Jan. 18, 2016 for counterpart European Application No. 15183754.9.

* cited by examiner

DEVICE FOR THE EXTRACTION OF BLEED AIR AND AIRCRAFT ENGINE WITH AT LEAST ONE DEVICE FOR THE EXTRACTION OF BLEED AIR

This application claims priority to German Patent Application DE102014217831.2 filed Sep. 5, 2014, the entirety of which is incorporated by reference herein.

BACKGROUND

The invention relates to a device for the extraction of bleed air and to an aircraft engine.

During operation of an aircraft engine, it may be necessary that a certain amount of air is diverted from the flowing air, so that it may serve as cooling air or as air for air conditioning a passenger cabin of an aircraft, for example. In the following, the diverted air will be referred to as bleed air.

The flowing air from which the bleed air is extracted can flow through a bypass duct or around the aircraft engine, for example.

Known devices for the extraction of bleed air permanently protrude into the air flow, thus constituting a flow resistance even if no bleed air is required from the aircraft engine.

SUMMARY

Therefore, there exists the objective to design the extraction of bleed air in a way that is efficient from the flow-engineering perspective.

It is possible to extract bleed air in a variable manner by adjusting means for the specific adjustment of an inlet cross section of an opening in or at a wall. The extraction of bleed air can be controlled depending on how the inlet cross section is aligned relative to the flowing air.

Here, in a first position of the inlet cross section, the opening can be closed or aligned in such a manner that no or substantially no bleed air enters through the opening. In a second position of the inlet cross section, the latter is aligned at an angle, in particular at a right angle with respect to the flowing air. Thus, air can flow through the inlet cross section in the second position.

For adjusting the inlet cross section the opening for the bleed air is arranged in or at a deformable base, with the adjusting means acting upon the deformable base for the purpose of modifying the inlet cross section of the opening relative to the flowing air. Here, the deformable base is a part of a metallic housing in the aircraft engine. What is in particular meant here by deformable is that the base is also elastically deformable.

In a special embodiment, a first deformable element including the opening is part of the wall, wherein the first deformable element is coupled to a second deformable element as a part of the wall, so that in the first position the deformable elements are arranged substantially parallel to the flowing air, wherein the adjusting means deforms the first deformable element by deforming the second deformable element in such a manner that in the second position the inlet cross section protrudes into the flowing air.

One option for coupling consists in a configuration where at least two deformable elements overlap each other, so that if a second deformable element that is arranged below a first deformable element is deformed, the top deformable element is also deformed during the deformation due to the overlapping. In this way, the top deformable element is thus moved along by the bottom one during deformation.

Here, the at least one deformable element can be configured as an elastically deformable element, in particular as a flat strip or bar.

Since the first and the second deformable elements are coupled to one other in the second position, in particular they are touching each other, the first deformable element has a blocking element, which serves as a stop collar for the second deformable element in the second position. Hereby, safe positioning is ensured in the second position.

In another embodiment, the adjusting means serves for acting on a deformable element in order to open or close an inlet cross section by moving the deformable element relative to a base element. Hence, the inlet cross section for the bleed air is modified here as well, wherein the size of the opening is directly manipulated.

In one embodiment, at least one sealing element serves for sealing the opening that is created during the deformation of the at least one deformable element, in particular when the deformable elements are punched out from the wall or the deformable elements have the shape of strips. Here, the at least one sealing element can be formed of a soft, flexible material, wherein the sealing element touches the at least one deformable element during operation under a prestress.

In another embodiment, the adjusting means comprises an electric, hydraulic and/or pneumatic actuator for adjusting the inlet cross section. These can transfer relatively large forces in a space-saving manner.

Thanks to the variability of the inlet cross section, it is possible to regulate the flow of bleed air via a valve and/or by means of an adjustment of the inlet cross section through the adjusting means itself. The valve may for example be arranged behind the opening for the inflowing bleed air. Alternatively or in addition to that, the alignment of the inlet cross section itself can be used for regulate the amount of diverted air.

The objective is also solved by an aircraft engine with the features as described herein.

BRIEF DESCRIPTION OF THE DRAWINGS

Exemplary embodiments of the invention are shown in the following figures.

DETAILED DESCRIPTION

Figure 1:
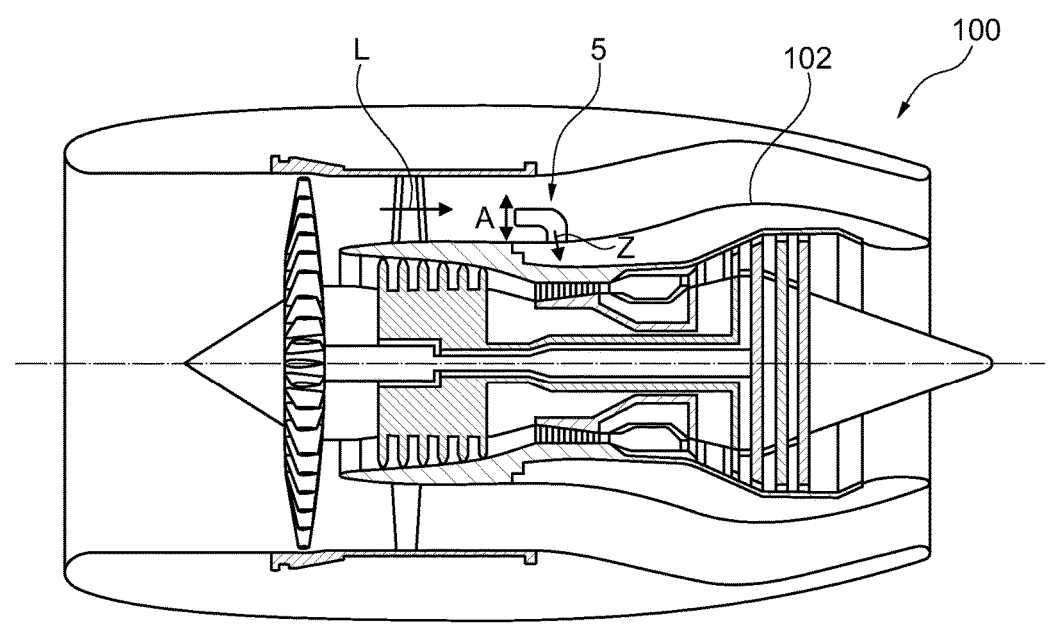
FIG. 1 shows a sectional view of an aircraft engine comprising an embodiment of a device for the extraction of bleed air.

In FIG. 1, a schematic sectional view through an aircraft engine 100, comprising a per se known device 5 for the extraction of bleed air Z, is shown. Here, the device 5 rigidly and permanently protrudes into the flowing air L in the bypass duct 101, so that the bleed air Z is extracted from the flowing air L. Here, the inlet cross section A of the opening 1 for the flowing air is constant and cannot be changed during operation. On the radially internal side, the bypass duct 101 is limited by a wall 102 (also referred to as a fairing).

After having been diverted from the flowing air L, the bleed air Z is guided, e.g. for cooling purposes, into the interior of the aircraft engine 100 or used for air conditioning the passenger cabin. In alternative embodiments, the bleed air Z can be diverted from another air flow, e.g. from the open air flow around the aircraft engine 100, and used for other purposes, like e.g. the air conditioning of the cabin of an aircraft.

In the following, embodiments of the device 5 for the extraction of bleed air Z are shown, in which a specific adjustment of an inlet cross section A of an opening 1 for bleed air Z is facilitated by means of an adjusting means 10.

Figure 2A:
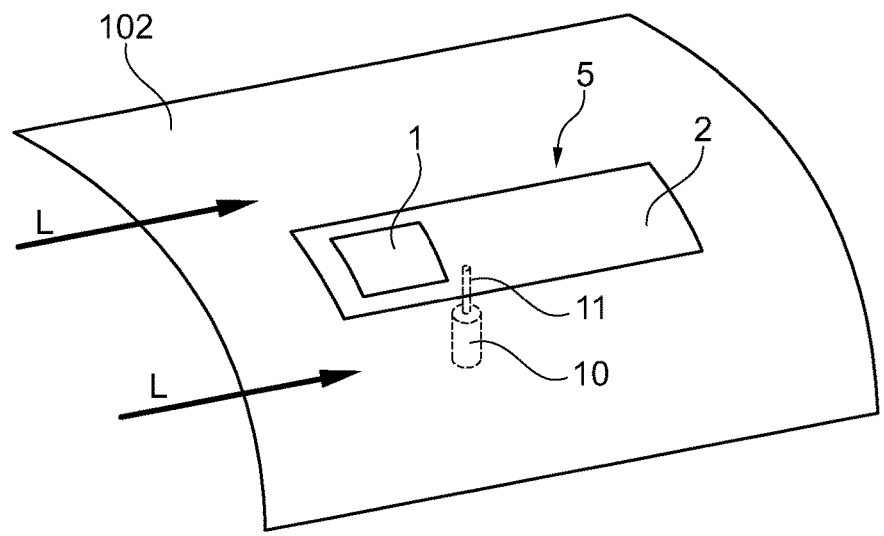
FIG. 2A shows a schematic perspective view of another embodiment of a device for the extraction of bleed air in a first position.
Figure 2B:
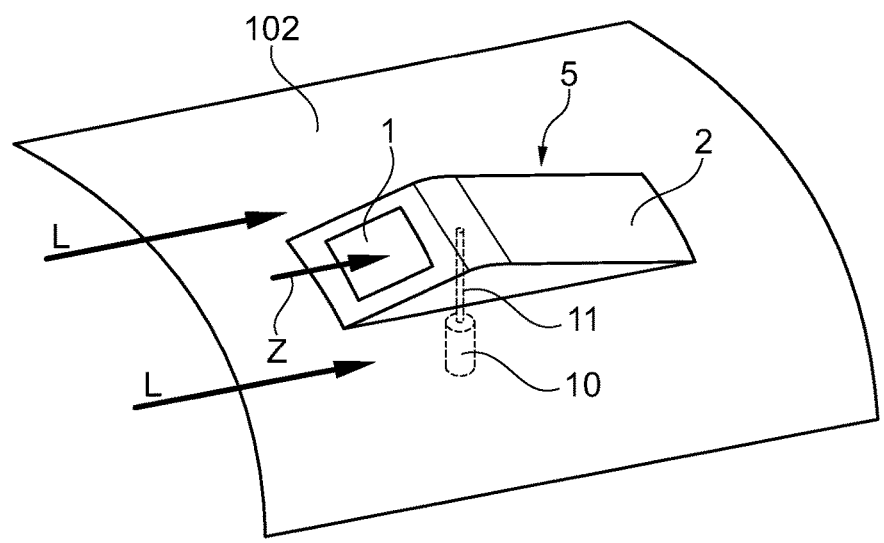
FIG. 2B shows the embodiment of the device for the extraction of bleed air according to FIG. 2A in a second position.

In FIGS. 2A and 2B, an embodiment of a device 5 for the extraction of bleed air Z is shown in two positions, respectively. Here, the device 5 for the extraction of bleed air Z has an opening 1 which is shown as being located inside a deformable base 2 in the wall 102 of the bypass duct 101.

In FIG. 2A, the opening 1 is arranged in the wall 102 in a flat manner and is overflowed by the flowing air L in the bypass duct 101. The inlet cross section A of the opening 1 is zero here, since the flowing air L flows in parallel to the opening 1; i. e. the flow resistance substantially corresponds to the one of a surface that is parallel to the streaming direction. Here, the opening 1 is arranged in a deformable and in particular elastically deformable area, the deformable base 2. The deformable base 2 can be made of a metallic material (e.g. a sheet metal) or a synthetic material (e.g. a silicone wall) here, or it can comprise these materials.

In FIG. 2B, another position of the opening 1 is shown, which has been obtained by an actuator 11 of an adjusting means 10 deforming the deformable base 2, i. e. in this case pushing it upwards. Hereby, the material is at least temporarily elongated. The deformation is shown in FIG. 2B in an exaggerated manner in order to render the principle more clear.

Due to the deformation, the inlet cross section A for the opening 1 is positioned in a slanted manner in the flowing air L, so that the bleed air Z can be diverted from the flowing air L. When the actuator 11 is reset again, the opening 1 substantially becomes flat again due to the elastic properties of the material, so that the situation as described in FIG. 2A is present.

In this embodiment, an elevation is introduced into the wall 102 in a substantially reversible manner by means of the adjusting means 10 in order to bring the opening 1 into the flowing air L.

In alternative embodiments, the adjusting means 10 can comprise an actuator 11 that is configured in a completely different manner. What is possible, for example, is the use of a kind of pad, which is filled with a hydraulic oil or compressed air in order to obtain the position of the opening 1 according to FIG. 2B.

Figure 2C:
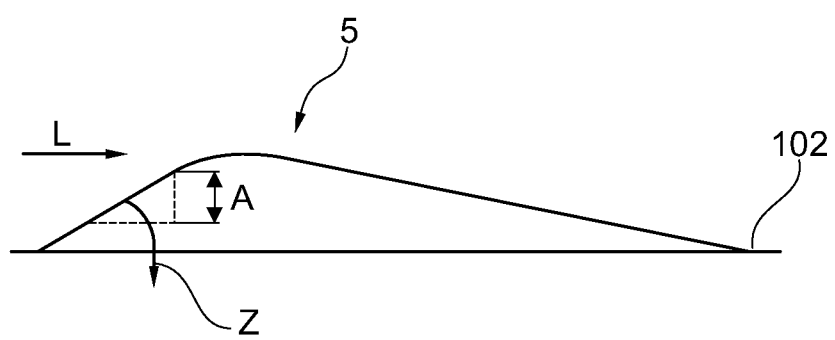
FIG. 2C is a rendering of a detail of the embodiment according to FIG. 2A.

In FIG. 2C, the concept of the inlet cross section A is shown once more. What is shown here is the surface that lies perpendicular to the incident flow L. Would the opening 1 in FIG. 2C protrude into the flow L at an 90° angle, the inlet cross section A and the opening 1 would have the same surface area. In other embodiments (see FIGS. 8A, 8B), the inlet cross section A can be located in front of the actual opening 1.

Figure 3A:
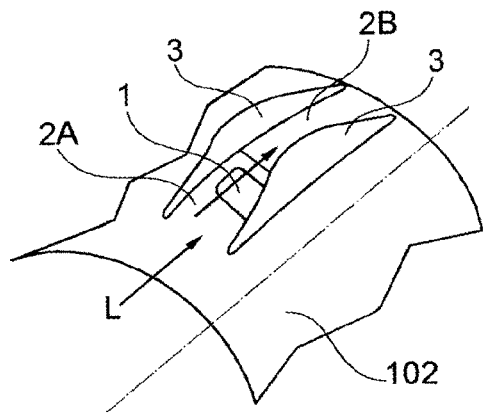
FIG. 3A shows a schematic perspective view of another embodiment of a device for the extraction of bleed air in a first position.
Figure 3B:
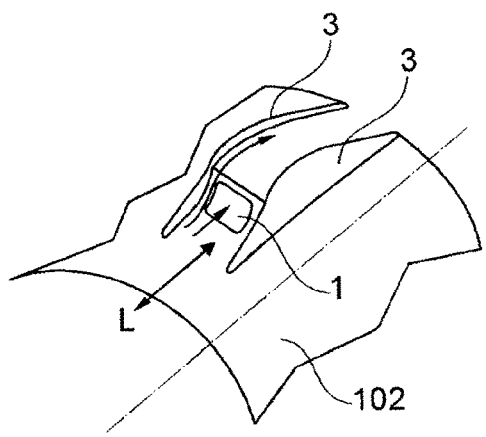
FIG. 3B shows the embodiment of the device for the extraction of bleed air according to FIG. 3A in a second position.
Figure 5A:
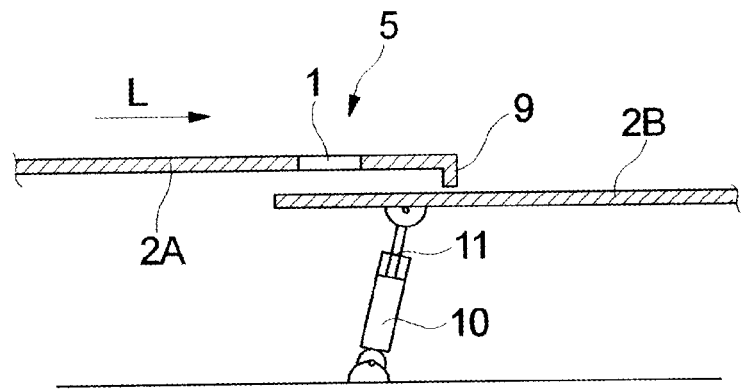
FIG. 5A shows a schematic sectional view of another embodiment of a device for the extraction of bleed air in a first position.
Figure 5B:
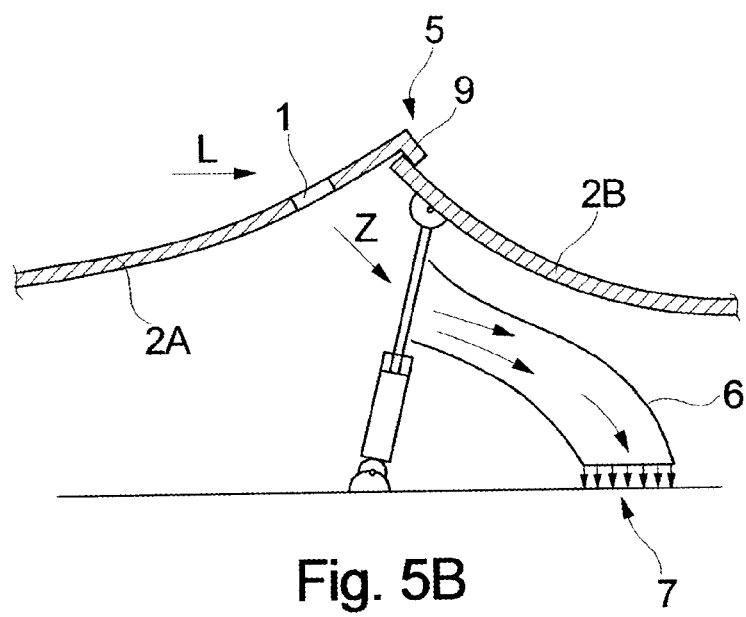
FIG. 5B shows the embodiment of the device for the extraction of bleed air according to FIG. 5A in a second position.

In FIG. 3A and 3B, a modification of the embodiment that is shown in FIGS. 2A and 2B is represented, in which sheet metals are deformed so that they may form an inlet channel. Here, too, an opening 1 is arranged in the deformable base 2. Here, the deformable base 2 has two deformable, in particular elastic, elements 2A, 2B (see e. g. FIG. 5A, 5B) that are overlapping with each other and are respectively arranged as deformable, flat bars (the elastic elements 2A, 2B could be illustratively referred to as tongues) at or in the wall 102. The opening 1 is arranged at the first deformable element 2A which is located at the top here.

For reasons of clarity, the adjusting means 10 with its actuator 11 is not shown here.

Figure 4A:
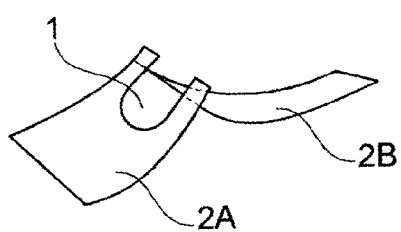
FIG. 4A shows a schematic perspective view of a variation on the embodiment of a device for the extraction of bleed air in a second position.
Figure 4B:
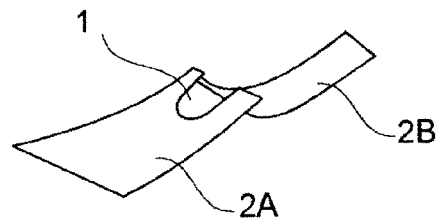
FIG. 4B shows the embodiment of the device for the extraction of bleed air according to FIG. 4A in an intermediate position.

In FIGS. 4A, 4B, a variation on the embodiment according to FIGS. 3A, 3B is shown, so that it may be referred to the description provided above. In contrast to the embodiment of FIGS. 3A, 3B, a U-shaped punching is provided here instead of a closed punching in the top deformable element 2A. The opening 1 in the second position (FIG. 4A) is formed by the top and bottom deformable elements 2A, 2B here. FIG. 4B shows an intermediate position.

Figure 4C:
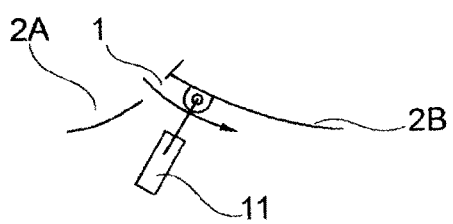
FIG. 4C shows the actuator for the adjustment of the inlet cross section of the opening in the embodiment according to FIG. 4A in a sectional view.

FIG. 4C shows in a schematic manner how the actuator 11 presses against the bottom deformable element 2B and in doing so takes the top deformable element 2A along in the upwards direction. In this way, the opening 1 [is] guided into the air flow L.

In FIGS. 5A, 5B it is shown in what manner the deformable elements 2A, 2B can be deformed, so that the inlet cross section A can be enlarged through the engagement of the adjusting means 10, as it has been described in connection with FIGS. 2B and 2C. At that, the actuator 11 presses against the bottom one of the two "tongues". The more the actuator 11 moves outward, the more the tongue-like deformable elements 2A, 2B are bent upwards, unblocking an ever larger air inlet cross section.

As the tongue-like deformable elements 2A, 2B are bent upwards, lateral openings are created that should mostly be closed off against the environment in order to largely prevent any leaking of bleed air Z through the lateral openings.

For this reason the embodiment according to FIGS. 3A, 3B comprises lateral sealing elements 3 that are arranged laterally next to the deformable elements 2A, 2B and in parallel to the flowing air L. Here, the radial extension of the sealing elements 3 approximately corresponds to the upwardly deformed surface of the deformable base 2 according to the positions shown in FIGS. 2B and 3B. In this manner it is ensured, in the position of the device 5 for the extraction of bleed air Z according to FIG. 3B, that at least a greater part of the bleed air Z is diverted into the interior space. The rigid sealing elements 3 can also be laminated with a soft synthetic material or be made of synthetic material, so that a better sealing effect towards the deformable elements 2A, 2B may be achieved. The sealing elements 3 can also be sheet metals.

In FIGS. 5A, 5B, an embodiment of the device 5 for the extraction of bleed air Z is shown, which principally functions in a manner according to the embodiments that are shown in FIGS. 2A, 2B, 3A, 3B, 4A, 4B. For reasons of clarity, sealing elements 3 are not shown here.

In the sectional view of FIG. 5A, the deformable base 2 of the device 5 for the extraction of bleed air Z is shown, wherein the deformable base 2 has two elastically deformable elements 2A, 2B here, which are respectively arranged in a tongue-like manner at or in the wall 102 of the bypass duct 101. The top deformable element 2A comprises the opening 1, wherein the top deformable element 2A overlaps with the bottom deformable element 2B in the first position (see FIG. 5A). In such a design, the overlapping leads to the opening 1 being sealed to a certain degree. In this position, the air L flows with little flow resistance over device 5.

The opening 1 can be covered at least partially by the bottom deformable element 2B in the initial position (FIG. 5A), so that a direct air flow into the interior is blocked off. As the angle of attack of the bottom deformable element 2B increases, the inlet cross section A is enlarged, because the bottom deformable element 2B presses the top deformable element 2A upward, so that the opening 1 is held more and more into the flowing air L.

The adjusting means 10 engages with the bottom deformable element 2B from below. Through an expansion of the actuator 11, the bottom elastically deformable element 2B is pressed upward (see FIG. 5B). Since the top elastically deformable element 2A overlaps with the bottom deformable element 2B, the top deformable element 2A is pressed upward as well. Hereby, the opening 1 is guided into flowing air L, so that the inlet cross section A increases and bleed air Z passes into the interior through the opening.

In FIG. 5B, a type of application for the bleed air is shown in a schematic manner, namely the cooling of a wall 7. For this purpose, bleed air Z that enters through the opening 1 is guided through a cooling channel 6 onto the surface to be cooled 7.

Here, the first deformable element 2A has a blocking element 9, that is formed or arranged at the end of the strip-type first deformable element 2A. The blocking element 9 is configured as a kind of hook that extends at a right angle in the direction of the second deformable element 2B. As shown in FIG. 5B, this blocking element 9 can form a stop collar when the second deformable element is bent upwards 2B, so that the second deformable element 2B cannot slip past the first deformable element 2A. In FIG. 5B, the second deformable element 2B is located not quite in the stop position.

Figure 6A:
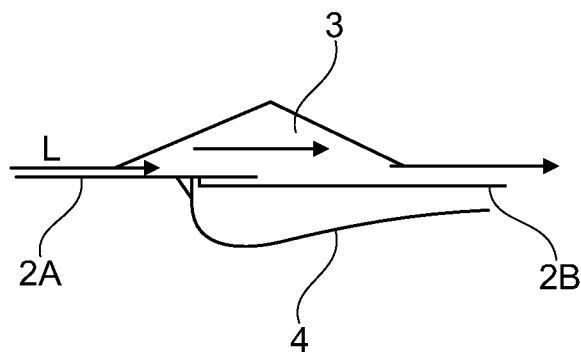
FIG. 6A shows a schematic sectional view of another embodiment of a device for the extraction of bleed air comprising a deformable flow guide device in a first position.
Figure 6B:
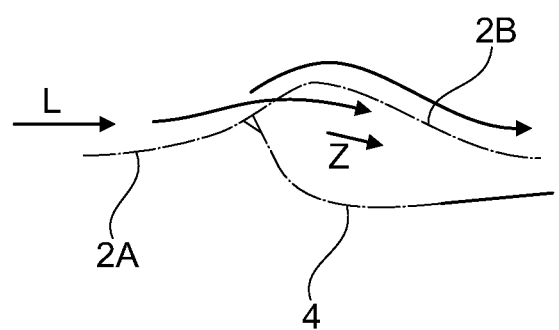
FIG. 6B shows the embodiment of the device for the extraction of bleed air according to FIG. 6A in a second position.

In FIGS. 6A, 6B, another embodiment of a device 5 for the extraction of bleed air is shown which comprises elastically deformable elements 2A, 2B, wherein the opening 1 for the bleed air Z is arranged in the first deformable element 2A. Here, the functionality corresponds to the embodiment according to FIGS. 5A, 5B, i. e. the adjusting means 10 with the actuator 11 that is not shown here engages with the bottom deformable element 2B. In FIG. 6A, the opening 1 in the first deformable element 2A is arranged in a flat manner and in parallel to the flowing air L. In FIG. 6B, the adjusting means 10 has been activated so as to press the bottom deformable element 2B upward, so that bleed air Z may flow into the interior. Below the wall 102, the embodiment that is shown here has a deformable flow guide means 4 for guiding bleed air Z that is bent into an approximate L-shape here, with its short leg being coupled to the first deformable element 2A. Here, the flow guide means 4 comprises a flat, flexible material such as a sheet metal, synthetic material or a textile material.

As the first deformable element 2A (FIG. 6B) is bent upward, the deformable flow guide means 4 is also pulled towards the top. The entering bleed air Z flows into the interior along this flow guide means 4. Thus, any possibly undesired forward diffusion of the flow of bleed air Z is substantially prevented.

The sealing elements 3 are drawn downwards (i. e. into the internal space, which is not shown here with view to clarity) and thus seal the flow guide means 4 at the sides. In this manner, a defined flow channel is formed by the flow guide element 4, the sealing element 3 and the deformable element 2B. Here, the flow guide means 4 can consist of a metallic material, such as a sheet metal, for example.

Figure 7A:
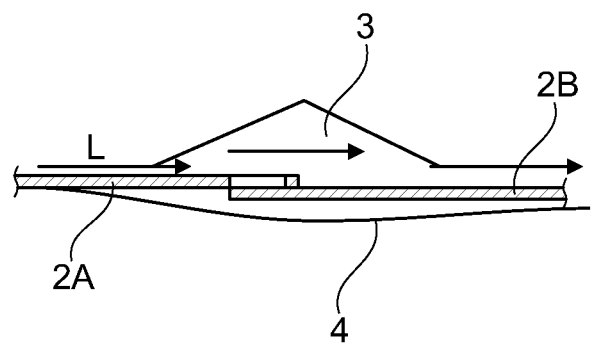
FIG. 7A shows a schematic sectional view of another embodiment of a device for the extraction of bleed air comprising a rigid flow guide device in a first position.
Figure 7B:
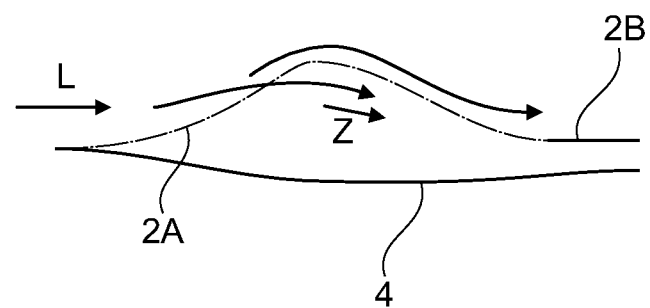
FIG. 7B shows the embodiment of the device for the extraction of bleed air according to FIG. 7A in a second position.

In FIGS. 7A, 7B, a modification of the embodiment of FIG. 6A, 6B is shown, so that it may be referred to the description. In this case, too, an adjusting means 10—which is not shown here for reasons of simplicity—acts on the bottom deformable element 2B (FIG. 7B).

However, in contrast to the embodiment according to FIGS. 6A, 6B, the flow guide means 4 is embodied so as to be relatively rigid. Also, the connection to the top deformable element 2A is arranged further away from the overlapping position of the deformable elements 2A, 2B. Thus, during the deformation of the deformable elements 2A, 2B, this flow guide means 4 is not carried along as far as was the case in the other embodiment.

In principle, the deformable elements 2A, 2B can respectively be provided with individual adjusting means 10 in all embodiments.

The embodiments of FIGS. 3 to 7 comprise two deformable elements 2A, 2B, which both are deformed by an adjusting means 10, wherein the adjusting means 10 only acts on one of the two deformable means 2B, respectively. At that, respectively one opening 1 in the wall 102 is moved into the flowing air L during deformation.

Figure 8:
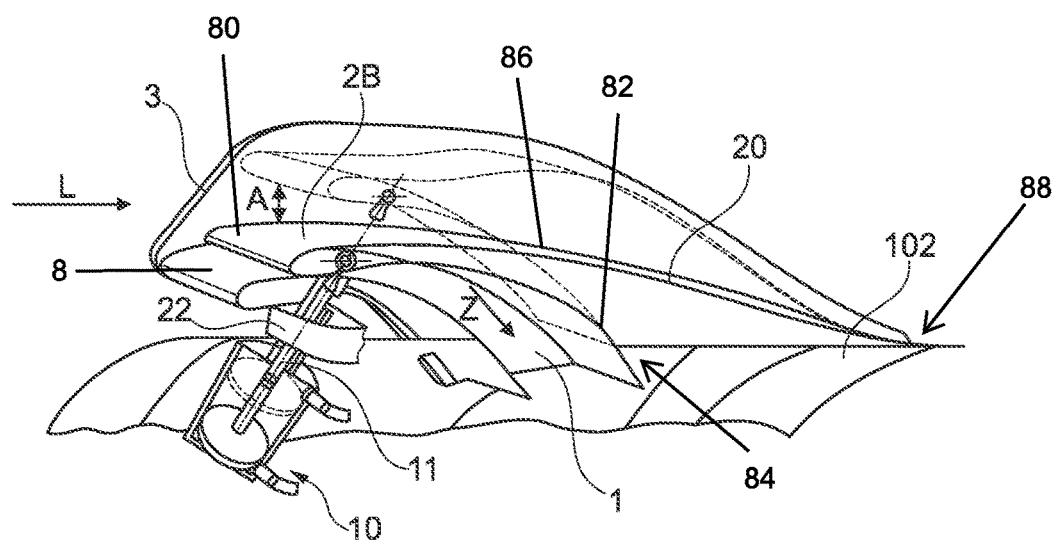
FIG. 8 shows another embodiment of a device for the extraction of bleed air comprising two overlapping elements for the formation of an opening.

FIG. 8 shows an embodiment in which only one deformable element 2B is moved by the adjusting means 10 in order to adjust an inlet cross section A of an opening 1 in the metallic housing 102. In FIG. 8, this opened position of the deformable element 2B is indicated by a dashed line. The deformable element 2B includes an upstream leading edge 80, a first wall 82 extending from the leading edge 80 to a first position 84 of attachment to the metallic housing downstream from the leading edge 80, and a second wall 86 extending from the leading edge 80 to a second position 88 of attachment to the metallic housing downstream from the leading edge 80, wherein the second position 88 of attachment is spaced downstream from the first position 84 of attachment.

In the closed position (solid lines), the upstream leading edge 80 of the deformable element 2B rests on a base element 8. The base element 8 as well as the deformable element 2B are configured here as flat strips of approximately the same size. The deformable element 2B and the base element 8 are limited on the sides by the sealing elements 3 (in FIG. 8, only the sealing element 3 that is located at the rear as seen from the viewing direction is shown).

FIG. 8 also shows a hydraulic cylinder of the adjusting means 10 in a schematic manner. When the hydraulic cylinder is moved upwards, the actuator 11 is moved upwards as well. The base element 8 has an opening through which the actuator 11 protrudes.

In the closed position, the deformable element 2B rests on the base element 8, so that there is no open inlet cross section A.

If the actuator 11 is now moved upwards, the deformable element 2B is pressed upwards, so that an inlet cross section A is opened. This now unblocks a kind of channel—formed by the deformable element 2B, two side walls of the sealing elements 3 and the bottom wall—for the bleed air Z in the direction of opening 1.

If the actuator 11 is moved further downwards, the deformable element 2B is lowered.

Downstream, a flow guide element 20 may connect to the deformable element 2B. It is arranged at the wall 102 (fairing) in a slidable or a firmly fixed manner. Thus, the flow of the inflowing air L is not interrupted at the beginning behind the deformable element 2B, but is guided on through the flow guide element 20. The flow guide element 20 is flexible and moves together with the deformable element 2B.

A streamlined sealing element 22 covers the actuator 11 in an aerodynamically favorable manner.

In the exemplary embodiments it has been explicitly referred to the use of the bleed air Z for cooling purposes. However, the embodiments are not limited to this kind of use. The bleed air Z can also be used inside the aircraft engine 100 for building up a pneumatic counter-pressure in a bearing, e. g. in order to prevent oil from leaking out of the bearing housing.

Parts List 1 opening for bleed air
2 deformable base
2A top (deformable) element
2B (bottom) deformable element
3 sealing element
4 flow guide means
5 device for the extraction of bleed air
6 cooling channel
7 surface to be cooled
8 base element
9 blocking element
10 adjusting means
11 actuator
20 flow guide element
22 sealing element
100 aircraft engine
101 bypass duct
102 wall (fairing)
A inlet cross section
L flowing air
Z bleed air

The invention claimed is:

1. A device for extraction of bleed air from flowing air at or in an aircraft engine, comprising:
an adjusting device including an actuator for adjustment of an inlet cross section of an opening for the bleed air in or at a metallic housing during operation of the aircraft engine;
a base element; and
a deformable element,
wherein the opening for the bleed air is arranged between the base element and the deformable element and the adjusting device acts on the deformable element to modify the inlet cross section of the opening relative to the flowing air by moving the deformable element relative to the base element, and
wherein the base element is part of the metallic housing in the aircraft engine,
wherein the deformable element includes an upstream leading edge which rests on the base element when the deformable element is in a closed position, a first wall extending from the leading edge to a first position of attachment to the metallic housing downstream from the leading edge, and a second wall extending from the leading edge to a second position of attachment to the metallic housing downstream from the leading edge, wherein the second position of attachment is axially spaced downstream from the first position of attachment.

2. The device according to claim 1, wherein in a first position of the inlet cross section the opening is closed or is aligned such that no bleed air or substantially no bleed air enters through the opening.

3. The device according to claim 2, wherein in a second position of the inlet cross section the opening is aligned at an angle to the flowing air.

4. The device according to claim 1, wherein the adjusting device is configured to act on the deformable element to open or close the inlet cross section by moving the deformable element relative to the base element.

5. The device according to claim 1, and further comprising a sealing element including at least two sealing walls positioned on opposite sides of the deformable element for sealing side openings between the base element and the deformable element that are created during deformation of the deformable element.

6. The device according to claim 5, wherein the at least two sealing walls are made of a flexible material, and wherein the at least two sealing walls touches the deformable element during operation under a prestress.

7. The device according to claim 1, wherein the adjusting device includes at least one chosen from an electric actuator, a hydraulic actuator and a pneumatic actuator for adjustment of the inlet cross section.

8. An aircraft engine with the device according to claim 1.

9. The device according to claim 2, wherein in a second position of the inlet cross section the opening is aligned at a right angle to the flowing air.

* * * * *